United States Patent
Ashbee et al.

(10) Patent No.: US 12,275,678 B2
(45) Date of Patent: Apr. 15, 2025

(54) VERMICAST PRODUCTION THROUGH CONVERSION OF BIODEGRADABLE ORGANIC MATTER

(71) Applicant: Greenscience Technologies Inc., Toronto (CA)

(72) Inventors: John Ashbee, Toronto (CA); Thomas Christiansen, Oakville (CA); Aladin Jarrah, King City (CA)

( * ) Notice: Subject to any disclaimer, the term of this patent is extended or adjusted under 35 U.S.C. 154(b) by 0 days.

(21) Appl. No.: 15/530,057

(22) Filed: Nov. 30, 2016

(65) Prior Publication Data

US 2018/0148391 A1 May 31, 2018

(51) Int. Cl.
| | |
|---|---|
| *C05F 17/05* | (2020.01) |
| *B01F 27/072* | (2022.01) |
| *B01F 27/702* | (2022.01) |
| *B01F 35/75* | (2022.01) |
| *C05F 3/00* | (2006.01) |
| *C05F 17/964* | (2020.01) |

(52) U.S. Cl.
CPC .......... *C05F 17/05* (2020.01); *B01F 27/0724* (2022.01); *B01F 27/702* (2022.01); *B01F 35/754551* (2022.01); *C05F 3/00* (2013.01); *C05F 17/964* (2020.01); *B01F 2215/0481* (2013.01); *Y02A 40/20* (2018.01); *Y02P 20/145* (2015.11); *Y02W 30/40* (2015.05)

(58) Field of Classification Search
CPC .... C05F 3/00; C05F 17/0009; C05F 17/0258; B01F 7/00141; B01F 15/0289; B01F 7/042; B01F 2215/0481; Y02A 40/205; Y02W 30/43; Y02P 20/145
See application file for complete search history.

(56) References Cited

U.S. PATENT DOCUMENTS

| | | | | |
|---|---|---|---|---|
| 3,761,237 | A * | 9/1973 | Jefferys ................. | C05F 17/50 71/9 |
| 5,093,262 | A * | 3/1992 | Kimura .................. | C05F 1/00 71/21 |
| 5,409,831 | A * | 4/1995 | Wright ................ | C05F 17/0229 435/290.2 |
| 5,551,969 | A * | 9/1996 | Wright ................ | C05F 17/0229 435/294.1 |
| 6,110,727 | A * | 8/2000 | Widmer et al. ........... | B01F 3/06 435/262 |
| 6,200,475 | B1 * | 3/2001 | Chen ........................ | B09B 3/00 210/613 |
| 8,703,477 | B2 * | 4/2014 | Berkson ................ | C05F 17/964 435/290.1 |
| 2013/0263786 | A1 * | 10/2013 | Meisel, III et al. .... | C05F 17/60 119/6.7 |

FOREIGN PATENT DOCUMENTS

| | | | | |
|---|---|---|---|---|
| KR | 20090106032 A | * | 10/2009 | ............. B01F 27/60 |
| KR | 20110059945 A | * | 6/2011 | ............. C05F 17/95 |
| WO | WO-2011076444 A1 | * | 6/2011 | .......... C05F 17/0247 |

* cited by examiner

Primary Examiner — William H. Beisner

(57) ABSTRACT

A feed stock-to-vermicast converter, comprising an enclosed flow-through vessel having an upstream inlet for introducing convertible feed stock into a mixed epigeic bed conversion zone adapted to accommodate a population of epigeic vermicast-producing worms, communicating with a vermicast-converted feed stock outlet.

14 Claims, 8 Drawing Sheets

VERMICAST PRODUCTION THROUGH CONVERSION OF BIODEGRADABLE ORGANIC MATTER

FIELD OF THE INVENTION

The invention relates to apparatus, methods and products associated with high value vermicast production through efficient conversion of feed stock materials.

BACKGROUND OF THE INVENTION

Biodegradable waste management in accordance with the present invention, entails decomposition as part of a rendering of material into some subset of its constituent matter. In the case of organic waste materials, such "decomposition" is a reference to any one or more of the divers processes through which an original organic constituency can be broken down into simpler organic and inorganic materials, from which it may then be reconstituted into other materials or useful forms. In any case, decomposition processes are important for sustainably recycling the finite resources of the planetary biosphere.

While organic substances in relation to the present invention are essentially biodegradable, there is a related conceptual distinction to be made between abiotic and biotic decomposition. In general, abiotic refers to the degradation of a substance by chemical or physical processes, e.g. chemical hydrolysis or oxidation. The latter refers to the metabolic breakdown of materials into simpler components by living organisms, (note too: that although it is typical for microbial decomposition to serve a primary and even a predominating role, it is not unusual for a broader ecology to be involved, including for example, worms and/or arthropods).

Decomposition can and does occur in nature. In this sense, decomposition is the "rotting" of organic substances (such as animal or vegetable matter) through the action of bacteria/fungi in which decomposition for the most part is a gradual deterioration that follows from lack of attention or intervention. Although organics, such as plant or animal tissues for example, naturally decompose in individually characteristic ways specific to whatever differences there are in their particular constituency and the environment in which the decomposition proceeds, there is a general sequence of events that characterizes most such decomposition activities. Initial biotic decomposition of organic tissues in general, can involve: autolysis, which entails self-destruction of tissues by that tissue's indigenous chemical and enzymatic processes; and/or, putrefaction, which entails the exogenous breakdown of tissues by bacteria and/or other microbes. Initial biotic decomposition can also be associated with the release of gases that are the chief source of putrid odors associated with the decay of plant or animal tissues. This off-gassing is in at least some measure associated with the localized availability of oxygen, the concentrations of which can be quickly reduced as a consequence of unbalanced cellular autolysis and collateral acceleration of aerobic microbial activity. The result promotes the proliferation of anaerobic organisms, which in turn consume correspondingly increasing amounts of the variously available carbohydrates, lipids, and proteins, to in turn produce disproportionate amounts of a variety of compounds including propionic acid, lactic acid, methane, hydrogen sulfide and ammonia. In addition to being offensive in greater or lesser degrees, such decomposition products can also slow the overall decomposition of the organic matter. Microbial and other biotic decomposition (i.e. by non-microbial actors) can be further slowed or inhibited due to either or both: the loss of readily available nutrients; or, the inhibitory/toxic effects of these anaerobic byproducts. The progress of natural biotic decomposition can be further retarded, as often evidenced in undisturbed rotting or static composting processes which result in localized increases in carbon and minerals such as phosphorus, potassium, calcium, and magnesium; changes in pH; and significant increases in nitrogen. This can lead not only to a marked transition in the ecology of active decomposers, but to a significant hiatus in the overall progress of decomposition. Not only does this relatively static condition slow the overall natural process, but systemic recovery from it can be heralded by a marked resurgence in biotic decomposition once some successor ecology of decomposers becomes established—and, if the establishment of the successor population is not moderated, there can be a significant and not always desirable redirection of the subsequent biotic decomposition. All of these factors play a significant role in natural decomposition—and represent inefficiencies that are addressed in various ways and to differing degrees of success in human-managed biodegradation processes.

Anthropogenic decomposition processes in general and biodegradation in particular, take a variety of forms. Landfills, far example, provide a waste management option which can capture at least some carbon associated with biodegradable wastes: But suitable sites, and fugitive methane emissions pose problems associated with this solution even with the most modern of landfill management practices. Moreover, a lack of a healthy micro-organism community is a significant factor in the slow biodegradation that does take place in landfills with environmental factors such as lack of oxygen, nutrients or water being the cause of the depleted biological numbers and diversity of the resident ecological constituency.

"Composting" per se is another human-mediated, predominantly microbial decomposition practice which is reasonably distinguishable from natural decomposition by way of "rotting", in that composting entails at least some minimum of attention or intervention being given to one or more of: blending/separating feed stocks and other inputs; temperature control; aeration and/or moisture management—typically all with the objective of accelerating the rate of decomposition and producing a compost which is essentially a vegetable material. Compost and composting in general, relates to organic matter that has been decomposed and recycled as a fertilizer and soil amendment. In the most general sense, the process of composting has always simply entailed collecting organic matter known as green waste (leaves, cuttings, food waste) into a mass, and waiting for the materials to break down into humus after a period of weeks or months that follows its collection. Modern, methodical composting and its diverse variants are multi-step, closely monitored processes with measured inputs of water, air, and carbon- and nitrogen-rich materials. The decomposition process is aided by shredding the plant matter, adding water and ensuring proper aeration by regularly turning the mixture. Aerobic bacteria and fungi manage the chemical process by converting the inputs into heat, carbon dioxide and ammonium. The ammonium is the form of nitrogen ($NH_4$) used by plants. When available ammonium is not used by plants it is further converted by bacteria into nitrates ($NO_3$) through the process of nitrification. As mentioned above, worldwide interest in recycling biodegradable feed stocks is growing as landfill options decline. Industrial scale composting is mandated by law in an ever growing number of countries. There have been process and product guidelines in Europe since the early 1980s (Germany, the Netherlands, Switzerland) and only more recently in the UK and the US. In both these countries, private trade associations within the industry have established loose standards. State law expectations look for composts to comply in some manner with the federal EPA 503 rule promulgated in 1984 for sludge products. Compost is regulated in Canada and Australia as well. Industrial composting systems are increasingly being installed as a waste management alternative to landfills. Mechanical sorting of mixed waste streams combined with anaerobic digestion or in-vessel composting provide for mechanical/biological treatments, and are increasingly being used in developed countries due to organic landfill regulations such as those mentioned above. For all of the recent interest, however, composting is hardly a new practice. Its practice dates to at least the early Roman Empire and for the most part the practice simply involved piling organic materials until the next planting season, at which time the materials would have decayed enough to be ready for use in the soil. The advantage of this method is that little working time or effort is required from the composter and it fits in naturally with agricultural practices in temperate climates. Disadvantages are that the pile occupies physical space that is not otherwise productive, and that rain water leaching and atmospheric drying are both problematic—and there is little control over the activity of disease-producing organisms and random activity of insects or vermin. Moreover there is little control exercised over processing temperatures with endogenous heat production leading to internal overheating while peripheral exposures lead to ambient heat losses at the other extreme. Composting was somewhat modernized beginning in the 1920s in Europe as a tool for organic farming and much of those influences persisted in North America from the 1960s through into the 1980s. Modern efforts however, continue to face the same problems historically associated with traditional, slow composting. Overall these efforts involve relatively few changes to traditional methods: they remain focused on finer and finer physical fragmentation and greater homogeneity in pre-processing and addition of feed stocks; controlling carbon-to-nitrogen ratio at 30 to 1 or less; and, careful monitoring of the moisture level during composting. It has been suggested however that attempts to advance modern composting have not made significant advances over the traditional methods that take a few months to work. The problems still facing the composting industry, a need for compost "curing" for fungi to extend the decomposition process sufficiently to reduce/eliminate phytotoxic substances. In this context, phytotoxin refers to substances in soils that can inhibit growth of, or are otherwise poisonous to, plants. Phytotoxic substances may result from microorganisms, or by naturally-occurring chemical reactions. A good compost will protect plants from toxic concentrations of such substances by ventilating gases, by decomposing or adsorbing organic toxins, or by suppressing toxin-producing organisms. Some examples of phytotoxins exist among the plant secondary compound classes of alkaloids, terpenes, and especially phenolics, though not all such compounds are phytotoxic. They can be found as well in herbicides and substances produced by bacteria. It is generally accepted that the presence of phytotoxins that may inhibit plant germination in compost amended soils, and that there is a possible tie up of nitrogen by incompletely decomposed lignin. Moreover, while compost is a source of humic material, its bioavailability and effectiveness is suboptimal. In summary, the inefficiencies of composting compromise its competitive advantages relative to an emerging trend for its raw materials to be subsumed in anaerobic digestion processes for the production of biogas fuels (with the downside of accelerated accumulation of greenhouse gasses in the atmospheric phase of the planetary carbon cycle).

Anaerobic digestion of biodegradable wastes can improve on the fugitive methane problems mentioned above in relation to landfills. Anaerobic digestion is also fast overtaking composting in some parts of the world (especially central Europe) as a primary means of down-cycling waste organic matter. Anaerobic processing conditions pushes feed stocks into gas producing biochemical pathways with reduced solids production. For example, Qatar constructed a 275,000 tonne/year anaerobic digester under license from a European company. Another large digester is operated in Pakistan, which has a capacity to convert 1,000 tonnes of waste per day to convert a substantial portion of the intake into fuels for further combustion use in several energy consuming industries, including cement manufacturing to heat up the associated kilns. It is recognized that such refuse-fuel initiatives can offset the rate of atmospheric "fugitive" methane accumulation: But fuel use still contributes to carbon dioxide greenhouse gas accumulation and diverts the input streams from the potentially more beneficial use of those feed stock resources would have in food production and terrestrial carbon portions of the global carbon cycle. While the economics of combustible fuels can encourage such practices over the use of biodegradable wastes in composting as described above, the ecological impact of anaerobic digester fuel production is less desirable.

There are essentially two approaches that have been taken with a view to improving resource competition for biodegradable waste resources as compared with the state of composting and anaerobic digestion as described above: thermophilic composting; and, decompiculture.

Thermal composting has been advocated as a means for accelerating composting per se. Thermophilic (high-temperature) composting is known to destroy many seeds and nearly all types of pathogens. The high heat associated with thermophilic composting is driven by microbial metabolism and is dependent on the physical transfer of heat within the composting material, the C: N ratio of the materials, moisture content and aeration. During this heating stage, temperatures will are typically in the 140 F (60 C) range. This type of composting also typically a batch process and in order to establish a sustained heating a 'critical mass' of feed stock is required and materials in the batch should have a C:N of between 20:1 and 40:1, and preferably between 25:1 and 30:1. Thermophilic bacteria require oxygen: known practices for meeting this requirement include "stick" holes in the composing heap or the use of venting pipes, or alternatively entail the use of coarse venting materials such as hay in layered compost heaps. The advantages of thermophilic composting as compared with traditional composting practices is that it enables processing of larger quantities of materials in a smaller area; can proceed relatively quickly under ideal conditions; can kill weed seeds and pathogens; and in large scale operations can proceed easily in cold weather conditions. Its disadvantages include being labor-intensive and requiring more attention; that the elevated processing temperature can kill off many beneficial microbes and is incompatible with most if not all detritovores; that it requires stock-piling until sufficient materials for 'batch' processing; and, heating itself can lead to considerable nitrogen loss. It also seems that post-composting curing may still be required.

Decompiculture-based processing of biodegradable wastes has been developed as either an alternative or adjunct to composting. "Decompiculture" is more elaborate than composting per se, and involves the use of microbial decomposers and one or more of various and diverse non-microbial detritivores. Detritivores are primary consumers and include organisms such as insects, worms, and isopod crustaceans. In general, detritivores, (also known as detritophages, detritus feeders, detritus eaters, or saprophages), are heterotrophs that obtain nutrients by consuming detritus (decomposing plant and animal parts as well as faeces). There are many kinds of invertebrates, vertebrates and plants that carry out coprophagy. By doing so, all these detritivores contribute to decomposition and the nutrient cycles. They should be distinguished from other decomposers, such as many species of bacteria, fungi and protists, which are unable to ingest discrete lumps of matter, but instead live by absorbing and metabolizing on a molecular scale (saprotrophic nutrition). As for the term "decompiculture", it is a neologism coined by forestry professor Timothy Myles of the Urban Entomology Program at the University of Toronto and refers to how detritovores, like termites, could be grown or cultured for a variety of uses—and proposes that decompiculture could eventually become a new biological field that could have significant and important impacts. (Decompiculture: Human symbiosis with decomposer organisms—Timothy G. Myles—revised, March, 2003—Centre for Urban and Community Studies, University of Toronto—455 Spadina Ave., Toronto, Ontario M5S 2G8 t.myles@utoronto.ca) According to Myles, "decompiculture" is the growing or culturing of decomposer organisms, including detritovores, by humans, with the term being intended to establish a contrast with the term agriculture. Whereas "agriculture" encompasses the production systems based on the culture of herbaceous plants and herbivore animals, decompiculture is the application of decomposer food chains in biodegrading animal or plant-based, or plant cell wall-based detrital materials.

"Vermiculture" and "vermicomposting" and "vermicasting" all involve decompiculture in which "worms" play a detritivore role: however, vermicomposting refers to processing in which the heterogeneous vegetable matter is the desired result, while vermiculture is the practice of worm production per se. Vermicasting is particularly focused on the production of high vermicast content products. Each entails making compromises between worm productions on the one hand and the vermicompost and/or castings, on the other. By way of example, a stocking density of 1.60 kg-worms/m2 (0.33 lb-worms/ft2) and a feeding rate of 1.25 kg-feed/kg-worm/day resulted in the highest bioconversion of the substrate into earthworm biomass, but the best vermicompost was obtained at the same stocking density and a feeding rate of 0.75 kg-feed/kg-worm/day—per Ndegwa, P. M.; Thompson, S. A.; Das, K. C. (1998). "Effects of stocking density and feeding rate on vermicomposting of biosolids". Bioresource Technology 71: 5-12. doi:10.1016/S0960-8524 (99)00055-3.

Examples of processes aimed more or less at "vermiculture" as such, are listed below. Optimization of worm production is the apparent focus of these references.

UA35207 discloses a method for rearing a vermiculture by means of cultivating worms in a sectioned container filled with a corresponding substrate. The sections are connected movably and arranged one above the other in such a way that the bottom of the upper section, where a mother vermiculture is located, is perforated with sizes of openings in the diameter of 1-1.5 mm and touches the surface of the substrate of the lower section.

RU2510997 disclose a device and method for vermiculture feeding on the basis of nitrogen. The device includes a dielectric tube of alternating section with placed in its front part axial ventilator, straightening grid, evenly distributing air flow, and high-voltage electrodes, which create voltage 18-25 kV with frequency 10-200 Hz. A sprayer with a water supply outside of the dielectric tube is installed in the converging part of tube. The addition of nitrogen-containing additives is purported to increase the earthworm population quantity and hence increase vermiculture profitability.

CN203467451 discloses a vermiculture device capable of biologically processing sludge on a large scale comprises an earthworm ecological culture bed established on the ground, wherein the ecological culture bed comprises a rice layer, a base material layer, a bait layer, a base material layer, a sludge layer and a medicine face layer from bottom to top, earthworms are inoculated into the sludge layer, ventilation pipes are laid in the base material layer, drainage ditches are formed in the two sides of the ecological culture bed and communicated with a water accumulation pool through drainage channels, a water blocking shelter and an overshadow layer are sequentially arranged above the ecological culture bed from bottom to top, and a humidity regulation device is arranged in the water blocking shelter. The vermiculture device can meet the requirement for biologically processing sludge on a large scale and is suitable for growth of the earthworms, meanwhile, sludge recycling comprehensive utilization is achieved, the breathability of the foundation bed is increased through the humidity regulation device, moisture of the foundation bed is regulated, and growth and breeding of the earthworms are facilitated.

CN203194343a vermiculture worm-containment system comprises earthworm ridges, wherein the earthworm ridges are arranged in parallel, and drainage troughs are formed among the earthwork ridges. The anti-fleeing vermiculture system is characterized by further comprising enclosing ridges and luminescent tubes, wherein the enclosing ridges are arranged around the periphery of the earthworm ridges, and the luminescent tubes are arranged in the enclosing ridges. Because the enclosing ridges are arranged around the periphery of the earthworm ridges, when earthworms flee outside in the rainy season, the earthworms will crawl up to the enclosing ridges from the earthworm ridges; a row of luminescent tubes are arranged in the enclosing ridges, so that due to the fact that the earthworms have the characteristic of liking shade and fearing light, when the luminescent tubes are turned on, the earthworms will crawl back to the earthworm ridges from the enclosing ridges under the influence of light. Characteristics of life of the earthworms are fully utilized and the enclosing ridges and the luminescent tubes are used, so that the earthworms are prevented from fleeing in the rainy season, and earthworm output is ensured.

US2006172410 discloses apparatus for use in a vermiculture plant, the apparatus including a treatment receptacle having a treatment Apparatus for use in a vermiculture plant which includes a treatment receptacle having a treatment chamber therein and a base upon which material within the treatment chamber is disposed. The receptacle is arranged so that when in use there is a space below the base. The apparatus further includes a harvester operable to extract material from the treatment chamber through the base and a collecting assembly including a flexible belt operatively connected to a rotatable drum so that it can be wound onto or drawn from the rotatable member. The belt is arranged so that it can adopt a collecting position when at least partially unwound from the rotatable member wherein it is positioned below the treatment chamber and harvester so that harvested material can be collected upon it and is operable so that when wound onto the rotatable member material thereon can be transferred to a discharge zone.

US2006131229 discloses apparatus for treating waste using vermiculture including a plurality of slats arranged in side-by-side relationship to form a vermiculture support and slat mounting means to which each of the slate is mounted, wherein some of the slats are mounted in abutting side-by-side relationship to one another to a width sufficient to support a first bed of feedstock for vermiculture and the remainder of the slats are arranged in spaced side-by-side relationship, the spacing being selected to provide for aeration of a bed of vermiculture feedstock which has been digested by a colony of selected worms.

RU2290806 and RU2290804 disclose a method involves placing worms into container filled with different substrates; holding; determining optimal cultivation conditions by frequency of encountered worms and amount of laid cocoons; charging annelids from the top into container; arranging substrates in layers and dividing the layers by means of netted partitions; holding worms during 1-2 days at temperature of 18-22 C; performing visual evaluation through transparent front wall. The method relates to determining optimal vermiculite cultivation conditions, increased number of substrates tested for one cycle, and reduced time consumed for experiment.

RU2115639 discloses an apparatus which contains casings with screen bottoms, side walls, and covers, which form a unit on common stay, and overflow pipe. In the bottom part of each casing, there are a pan and a support consisting of vertical legs and a perforated plate. Side walls of casing are inclined inside at angle 5 deg. and provided with vertical ribs with guides made at angle 25 deg. Thickness of vertical ribs is 1-5 mm and distance between them 5 to 12 mm. Casings are perforated in one of their parts and have back protrusions and bearing bosses. Cover of each casing consists of upper pan with perforated bottom, loading cone, and suspended bosses. Screen bottom is executed in the form of continuous tape of air and moisture-impermeable cloth with side bulges. Perforated plate of the support is positioned at the same level with perforated part of casing.

RU2103868 A method for treating organic waste is disclosed. The pH value in the initial material is measured and, if deviation from neutrality is found, a solution is prepared with hydrogen ion concentration corresponding to neutralizing initial material by wetting it. When wetted, material contains 70-80% moisture. The pH of material is periodically checked and, if necessary, material is additionally wetted by an electrolysis solution to attain optimal pH value. Such operations are repeated until substrate is fully ripened. Ripened compost is used as basic substrate for growing vermiculture. To isolate worms' biomass, substrate is wetted by only one of solution fraction with limit pH value. For directional isolation of worms' biomass, substrate is batchwise wetted by one of electrically activated solution fraction on the side opposite to forced displacement of worms. Operation is resumed until complete or partial isolation of biomass.

RU94016504a device in which a substrate with vermiculture is disposed in casing and acting on surface layer of substrate with radial or mechanical irritator. After passing of vermiculture in lower layers, surface layer is removed with mechanism. Receiver with reservoir arranged under casing partially filled with artificial aggregate is filled up with liquid. Artificial aggregate floats up to level of net. After full passing of vermiculture from substrate into artificial aggregate it is fully displaced in liquid and mixed with mixer. After separation of vermiculture from pieces of aggregate, liquid with vermiculture is fed through hole in auxiliary reservoir where liquid is passed through branch pipe, and vermiculture is delivered by auger with alternating pitch. Then the vermiculture juice is collected in juice collector.

NZ525181 discloses a method and apparatus is shown for a treatment and conversion process to convert a feed material of biodegradable waste and/or organic matter into products such as soil conditioners, fertilizers, animal fodder and biomass. The apparatus includes a heating vessel in the form of stirred tank for heat-treating the feed material and a treatment chamber in the form of worm bed where the heat-treated material is then treated by a vermiculture process to convert the heat-treated material into the products: The heat treatment stage functions to sterilize and kill pathogens and germinating materials such as seeds and weeds found in feed material while substantially preserving the feed content for the subsequent vermiculture step and the preferred embodiment involves adding steam to an aqueous pulp of the feed materials. The vermiculture step then involves the use of several varieties of worms to consume all or part of the heat-treated material in an environment where the conditions of life of the worms are optimized for breeding. The worm cast harvesting system using a wire cutter can cleanly slice or shave the worm cast product in a plane parallel to the bed base as the cutter device is drawn along the underside of the bed in one direction, without disturbing the structure of the cast located within the bed and reducing the incidence of any untreated feed and worms being dislodged, a common problem found in the more intrusive prior art cast harvesting devices.

There are also many examples of processes which attempt to combine vermiculture and vermicomposting processes, including the examples set out below. At the end of the day, however, the available feed stock limits how much of each can be produced.

MD632 relates to the production technology of vermiculture and vermicompost by processing the plant residues of the agro-industrial complex, food and fishing industries, as well as inorganic waste. The plant for the production of vermiculture and vermicompost consists of at least one module, which includes a reservoir for the substrate, vermiculture and vermicompost, made in the form of a rigid modular construction, consisting of vertical central and lateral mountings, on which are fixed side frames, fastened by means of brace rods, and bearing angle pieces, on which are mounted thrust frames, on which is placed a grid. To the side frames, vertical lateral mountings and bearing angle pieces are attached with the possibility of assembly-disassembly longitudinal and transverse sandwich insulation panels. On the surface of the longitudinal panels is mounted a heating element, made of carbon fiber, placed in an electrical insulating sheath. At one end of the reservoir is fixed a processing platform, to which is fixed a central guide, mounted along the full length of the grid, on the guide is mounted a carriage with a vermicompost extractor with a mechanism of its reciprocating motion and limiting lateral guides mounted along the full length of the grid. The vermicompost extractor contains three flaps, rigidly fixed on the carriage, parallel to each other, with some distance between them.

US2013066793 discloses "Winrows" as a specific process which executes in synergy with Fill-A-Box CR and Stat-Medicament-Disposal removal of food waste (bio-waste) from landfills and water systems. It quantifies data by address/location by weight of food waste (bio-waste) that is then converted under cap and trade to carbon off-set credits for address/location through Greenebank. It is a converted 13 gallon collapsible garbage holder that has been modified to hold extra bags and a carbon filter. The food waste (bio-waste) is used in vermiculture, and composting. The liquid by-product and final product is harvested and sold and any excess is converted to swill for pig feed. Curbside pickup by Fill-A-Box CR™ scans and weighs the bags and transmits data to Winrows database by address/location.

RU2467989 discloses a method of treating organic wastes using vermiculture with *Eisenia fetida* earthworms, wherein a strain of *Trichoderma asperellum* MG-97 (VKPM F-765) in form of spores or mycelium or a preparation of trichodermin M are simultaneously added with the earthworms to the starting substrate in amount of 10-10 CFU/kg of the starting substrate. The method is purported to improve the quality of the obtained product, associated with improved fungicidal and plant growth stimulation properties, as well as shorter period of treating organic wastes and high output of earthworm biomass.

AU2010100402 relates to a device for use with vermiculture and the production of worms as well as organic liquid and solid fertilizer production. It provides for an improved shelter for use in vermiculture comprising a tent design which is ergonomic and user friendly for handling purposes and operation.

US2002144658 discloses a composting plant e.g. for use in vermiculture, comprises a cruciform type breaker bar unit for moving the bottom layer of worm worked material through the perforated floor (elevated discharge floor) of the plant. Alternative designs of breaker bar unit are also described.

WO2008129158 relates to a method and an apparatus for processing organic waste in an assembly that comprises at least three contiguous containers defining a loop-type horizontal processing line. Each container includes a lid with ventilation holes, two perforated vertical walls allowing the worms to move from one container to the next in the loop, a device on the inner side of each perforated wall, for inserting a plate in order to close off optionally the wall, a perforated bottom for liquid flow, a liquid collecting tray. A first container is filled with waste on top of which the worms are added. The following containers are in turn filled. After digesting the waste of a container, the worms migrate through the vertical perforated walls towards the following container. The container processed is then emptied of the compost left by the worms and repositioned in the processing line. The containers are arranged so that the line defines a loop, wherein the following container becomes at a given moment the initial container which is again filled with waste. The recommended type of worm is *Dindrodrilus rubidus*. The method is also suitable for vermiculture.

EP patent application 0326069, 1994, discloses a device comprising a concrete trench and an extraction tool for removing vermicompost and vermiculture from the trench. The trench arrangement includes a fixed frame with horizontally arranged perforated walls, the uppermost of which is made in the form of an inverted trough. Throughout the system are posted means of aeration and moisture of the processed agricultural waste. In use, the perforated walls are filled with the waste material, where it is moistened and the top layer of the material is seeded with an original number of worms. Gradually worms migrate throughout the volume of material. After completion of a trench paddle extracts the worms and vermicompost. The two are separated with the vermicompost being diverted for use in crop production, while some number of the worms are used for processing the next batch of material, and the others used as an animal feed.

The device and method are suited to commercial scale operations, however it has been reported that the use of corresponding quantities of recyclable material leads to uneven wetting and aeration problems, which both degrades the quality of vermicompost and increases the processing time.

French patent application 2561869, 1986 comprises manure-composting boxes adapted to be assembled in a stacked relation. The boxes are inoculated with an initial number of worms, and the tops are covered with paper or plastic. The sides of the boxes include holes for aeration and the addition of moisture to the manure. After the complete processing of manure worms boxes opened and emptied, followed by separation of the vermicompost and worms. Here too, the vermicompost is employed as fertilizer and the worms partly for processing subsequent batches of manure, and otherwise as a protein source in animal feed. A disadvantage of this device is that its passive approach to aeration and hydration is locally limited to the feedstock adjacent the holes, which leads to low productivity and the complexity of the process.

UA33219 discloses a method to vermicompost litter manure, which includes layered coating of vermicompost with vermiculture, litter manure, a filler, creating corresponding conditions by means of irrigating and aerating, the layers of materials are disposed in netted trays which are arranged one upon the other. Each of the netted trays with the vermiculture adjoins from above or from below with the netted trays correspondingly with litter manure on one side and a tray with organic and mineral fillers on the other side, and, after processing of the litter manure is finished, the netted trays with the ready vermicompost, from which the worms moved into the adjacent trays and in which at the beginning of the process the vermicompost with the vermiculture had been arranged, are taken out, and the trays with litter manure and trays with organic and mineral fillers are arranged correspondingly in place thereof.

RU2013951, 1994 comprises a module including a pair of cylinders mounted vertically one above the other and separated by a flat ring. In the upper cylinder load recyclable material to be processed by vermiculture, and in bottom cylinder a discharge hatch is used to unload the finished product containing vermicompost and worms. No provision is made for moisture and aeration control, which increases the processing time, reduces the performance of the device and degrades the quality of vermicompost.

RU2033049, 1995, containing installed on the rack boxes, in which holes and the side walls are arranged at an obtuse angle to the base, and the boxes are with the possibility of changing the angle of inclination relative to the surface of the earth. The boxes are filled with a mixture of recyclable material (waste from agricultural production) and worms and left for a period of time until processing is completed. No active hydration or aeration are provided, which increases the time required for processing and degrades the quality of vermicompost.

A vermicompost and vermiculture device is disclosed in Russian patent 2115640, 1998, which comprises a housing with side walls and a bottom with a net structure. The housing has a tray with an overflow pipe and is arranged in a stand consisting of vertical supports and a perforated plate with side walls is provided with vertical edges and guides, and a bottom and additional side walls are formed by a fabric bag that is inserted into the case. When in use, raw material for production of vermicompost is placed in the fabric bag that is inserted into the housing. The device is placed in a warm place, covered with a dark film and leave for 120 days.

Water is added occasionally in amounts sufficient to provide for a flow of water through an overflow tube. At the same time keep the water temperature in the sump housing 1-6° above the temperature of the walls of the shell, which provides a constant moisture content of the fabric bag water vapor. After the complete processing of raw materials to separate worms from the vermicompost. A disadvantage of this arrangement stems from the limitations imposed by the volume of the bag, as well as the need for periodic replacement of the fabric of the bag due to its wear and tear, increasing labor costs and reduces the performance of the device.

RU2115639, 1998 includes plurality of enclosures each with mesh bottoms, side walls and lids, and arranged on a common rack. At the bottom of each module are the tray, overflow pipe and stand, consisting of vertical supports and a perforated plate. The housing side walls are fitted with vertical edges and guides, and the housing further includes an inclined wall, a perforated portion, the back ledge and support. The cover consists of a top tray with a perforated bottom and a mesh bottom in the form of continuous strips of fabric.

U.S. Pat. No. 6,548,294 is particularly concerned with harvesting vermicast from a vermiculture operation. It discloses apparatus suitable for use in the treatment of waste and/or organic materials which includes a main body having a treatment chamber therein having a base which when the apparatus is in a harvesting mode is arranged with a space there below. The base includes a plurality of generally parallel spaced apart support elements, the support elements being spaced apart at a distance sufficient to support the material within the chamber during the treatment process and enable extraction of the treated material through the spaces between the support elements during a harvesting process. There is also disclosed a harvesting device comprising a plurality of extraction elements which are adapted to project through the spaces between the support elements to dislodge and extract the treated material through the base. The apparatus and harvesting device is particularly useful for removing worm casting in vermiculture.

Vermicomposting per se, is the rendering of organic material by microbial actors and worms. For their part, worms fulfill a two-fold purpose by breaking down the larger particulates and less tractable materials by worm digestion to facilitate composting by other actors, and collaterally producing some amount of vermicast. Vermicomposting profoundly differs from thermophilic composing in its use of both worms and microorganisms. Worm composting is also a much cooler process—working best at 59-86 F (15-30 C). Vermicomposting has certain advantages over thermophilic compositing, including: being at least somewhat less labor-intensive—no turning/aerating necessary (worm activity helps to mix, fragment and aerate materials); using cooler temperatures helps to conserve nitrogen; there is academic evidence to indicate that vermicomposts have beneficial properties not found in hot composts; and under ideal conditions, wastes can be processed more quickly than thermal composting. However, in general vermicomposting: requires a greater square foot commitment than does thermal composting; necessitates worm separation from the compost. Vermicompost is the product or process of composting through the utilization of various species of worms to create a heterogeneous mixture of decomposing vegetable or food waste, bedding materials, and vermicast. Vermicomposting is widely used in North America for on-site institutional processing of food waste, such as in hospitals and shopping malls. This type of composting is sometimes suggested as a feasible indoor home composting method. Vermicomposting has gained popularity in both these industrial and domestic settings because, as compared to conventional composting, it provides a way to compost organic materials more quickly (as defined by a higher rate of carbon-to-nitrogen ratio increase) and to attain products that have lower salinity levels that are therefore more beneficial to plant mediums, (Lazcano, Cristina; Gómez-Brandón, María; Domínguez, Jorge (2008). "Comparison of the effectiveness of composting and vermicomposting for the biological stabilization of cattle manure". Chemosphere 72: 1013-1019. doi:10.1016/j.chemosphere.2008.04.016). Vermicomposting is typically associated with shallow-dwelling worms that feed on decomposing plant matter and which adapt easily to living on food or plant waste in the confines of the typical shallow worm trays used in vermicomposting—although other species with other ecological habits may also be used in vermiculture operations. As a generalization, vermicompost worms derive their nutrition from many forms of organic matter in soil including decaying plant parts, decomposing remains of animals, and living organisms such as nematodes, protozoans, rotifers, bacteria, fungi. Vermicomposting, whether per se or in some combination with vermiculture, is used for medium-scale on-site institutional composting, such as for food waste from universities and shopping malls: selected either as a more environmental choice, or to reduce the cost of commercial waste removal. Containing water-soluble nutrients, vermicompost is in general considered to be an excellent, nutrient-rich organic fertilizer and soil conditioner. Large-scale vermicomposting is practiced in Canada, Italy, Japan, Malaysia, the Philippines, and the United States. The vermicompost may be used for farming, landscaping, to create compost tea, or for sale. Some of these operations produce worms for bait and/or home vermicomposting. There are two main methods of large-scale vermiculture: windrow; and raised bed. Systems employing a windrow, consist of bedding materials for the earthworms to live in and acts as a large bin; organic material is added to it. Although the windrow has no physical barriers to prevent worms from escaping, in theory they should not due to an abundance of organic matter for them to feed on. Often windrows are used on a concrete surface to prevent predators from gaining access to the worm population. The second type of large-scale vermicomposting system is the raised bed system. Here the worms are fed an inch of "worm chow" across the top of the bed, and an inch of castings are harvested from below by pulling a breaker bar across the large mesh screen which forms the base of the bed. Because red worms are surface dwellers constantly moving towards the new food source, the flow-through system eliminates the need to separate worms from the castings before packaging. Raised bed systems are well suited to indoor facilities, making them the preferred choice for operations in colder climates. In continuous vertical flow systems, a series of trays stacked vertically. The bottommost tray is filled first, with bedding material. Then a layer of soil which organic matter is then added too. Another bin made in the same fashion can be stacked on top of a filled bin. Worms finish composting the materials in the bottom tray and then migrate to the one above. When a sufficient number of worms have migrated, the vermicompost in the bottom tray can be collected and should be relatively free of worms. These trays provide an easier method of harvesting vermicompost. In continuous horizontal flow systems, a series of trays lined horizontally. This method too relies on the earthworms migrating towards a food source in order to ease the process of harvesting. The bin is usually constructed to be similar to a non-continuous tray but longer horizontally. It is divided in half, usually by a large gauge mesh. One half is used until it becomes full, then the other half is filled with bedding and organic matter. In time, the worms migrate to the side with the food and the compost can be collected. Vermicompost benefits soil by: improving its physical structure; enriching soil in micro-organisms, adding plant hormones such as auxins and gibberellic acid, and adding enzymes such as phosphatase and cellulase; attracting deep-burrowing earthworms already present in the soil (promote bioturbation); improving water holding capacity; enhancing germination, plant growth, and crop yield; and improving root growth and structure.

RU2488997 discloses a method of disposing the cellulose-containing wastes. The method of disposing the cellulose-containing wastes by using vermiculture with earthworms *Eisenia fetida* and culture of fungi *Trichoderma viride* comprises a preliminary oral inoculation of earthworm *Eisenia fetida* with using an insulin syringe with a sawed-off point of the needle with the suspension of mycelium and spores of a cellulose-digesting strain of week-old culture of fungi *Trichoderma viride* with the content in it of colony-forming units in the amount of 10 CFU/ml in amount of 0.05 ml, or daily exposure of the worms in the substrate saturated with such suspension. The objective is to intensify the disposing of cellulose-containing wastes by producing a population of earthworms having increased cellulosic activity.

US2010273251 discloses a vermicomposter which is a composting device that uses earthworms or worms to accelerate the composting process. A multiple tray system is used to greatly increase compost production and for convenience of compost harvesting. The invention uses thermal siphon airflow and light-tight air permeable connections between its members to increase compost production. The vermicomposter comprises: a base with collection tray, at least one stacking tray, and a light-tight air-permeable lid. The upper surface of the base forms the collection tray which comprises: a set of sides, a bottom, a set of support ribs with notches, and is open on the top to form a liquid-tight container. Notches are sectioned out of the upper inner corner of each support rib. Each notch defines on the rib: a notch bottom surface, a notch side surface, a side vent distance, and a lower vent distance. One mode of the invention further comprises a worm ladder which comprises: a horizontal-flange, at least one ramp, and large void area. A stacking tray comprises: a wide brim, a set of sides, a bottom, and is open on the top. A light-tight air-permeable lid is used to cover the upper most stacking tray and provide a light-tight air-permeable cover for the device. The lid comprises: a large dome area, a wide brim, a skirt, a set of vertical support ribs, and a set of lateral support ribs.

US2002115199 relates to a composting device for composting organic waste, specifically animal and vegetable household waste. The device consists of a container having four rectangular sides, a base and a removable, reversible cover. The container is provided with a sealable compost extraction opening disposed on a front side of the container near the base. Ventilation openings are provided in the sides. One surface of the cover and front side of the container is painted dark to absorb sunlight and heat the interior chamber defined by the container. The opposing side of the cover is painted white to substantially reflect sunlight. The cover is removed and waste is added to the container through the top. Worms and microorganisms provide means for degrading the waste into compost, which is removed through the extraction opening adjacent to the base for recycling. The temperature in the compost may be adjusted by increasing or decreasing absorption of sunlight. The temperature gradient thus formed in the container draws air through the ventilation openings and into the container to provide ventilation for the composting waste. In one embodiment, the composting device is provided in the form of a kit for home assembly.

RU2264372 pertains to devices for processing of sediments of household and similar industrial waste waters into a compost by means of a vermiculture and may be used in the municipal services of the camp-type settlements, villages, recreation centers, in individual houses at the cottage-type building-up on the territories without sewerage systems. The vermicomposting device for a complete purification plant is made in the form of a bed on supports used for growing of the vermiculture, equipped with a system of tools for watering of the vermicompost, shelter from action of direct sun rays in summertime and a preheating in winter, feeding in of composted wastes and a removal, of a ready compost. The bed is made in the form of an inverse truncated pyramid with the open upper base, with an opening hatch in the lower base and holes in a side surface of one of lateral planes of the pyramid in the form of a horizontal row and spaced with a step of no more than 20 mm and with a diameter of no less than 10 mm used for insert to the full depth in a horizontal plane of a row of spokes cutting the upper part of the compost from the lower part, discharged from the device at opening the hatch in the lower base. The technical result is simplification of vermicomposting device servicing and creation of conditions for intensification of process of the organo-mineral raw processing into vermicompost.

WO0246127 discloses a method in which organic waste is mixed and shredded in a mixer shredder and composted in a thermophilic composting system. A portion of the compost as used as feedstock for a vermiculture system to produce worm castings. The compost and castings can be used separately or blended. Liquid wastes may be treated in a digester by aerobic or anaerobic digestion, and the resulting sludge fed to the vermiculture system.

U.S. Pat. No. 6,223,687 discloses an apparatus and process for the efficient vermicomposting of organic containing wastes. A continuous two to eight inch deep thin layer of biomass is formed in which worms are established and encouraged to compost and migrate. The thinness of the biomass layer increases uniformity and allows for a higher rate of worm activity. By moving the biomass upon a conveying surface a continuous open system is created. New matter is introduced, digested and withdrawn while maintaining the active worms within a portion of the biomass. Spatial efficiency is provided by creating multiple beds in a stacked configuration.

RU2244698 discloses an apparatus and method for composting with the use of vermiculite culture. The apparatus has casing, horizontally positioned perforated member adapted for accommodation of wastes and vermiculite culture, and water receiving device. Casing is made in the form of cylindrical segment. Perforated member is spaced from cylindrical member axis by distance making 50-75% the radius of cylindrical segment. Water receiving device is made in the form of part of cylindrical segment arranged under perforated member. Apparatus is equipped with frame. Casing is mounted on frame for lifting to an angle of up to 45 degrees and is furnished at its ends with gates for discharging contents therefrom and with water inlet and water outlet branch pipes. Method involves placing onto perforated member preliminarily prepared material to be processed and having pH=6-8 and basic amount of worms; wetting the material to predetermined moisture content at preliminarily selected temperature; providing composting while maintaining predetermined temperature and moisture content in layer of material under process. The layer has thickness of from 20 to 50% the radius of cylindrical segment. Lower part of casing is filled with water, which is heated by means of heaters to temperature of 19-21 degrees C. Worms are introduced into this layer of material in an amount of from 50 to 400 species per 1 m3 of material under process. Composting process is provided at temperature of 20-23 degrees C. and layer moisture content in the range of 60-85% for 1-3 months. Upon termination of composting process, ready compost is discharged from the casing.

SUMMARY OF THE INVENTION

In biodegradation of organic materials, challenges arise in both efficiently proportioning the production of vermicast as well as in separation of the vermicast from other vermiculture or vermicompost production. To compete most effectively for feed stock resources against the alternative offered by anaerobic digestion biofuels technology, a competing technology must provide the best possible value-added outcomes. Landfill does not make reuse a tenable proposition and natural composting is too random/slow to be commercially useful. Traditional anthropogenic composting per se (reliant on microbial actors) is a mature technology and beyond its increasingly narrower and smaller refinements, has not overcome what seems to be its intrinsic limitations. Thermophilic composting is arguably the pinnacle of such refinement, and even so has its own limitations. Forms of decompiculture other than those associated with the present invention are also faced with shortcomings. As useful as worm biomass from vermiculture may seem to be in a particular circumstance, the shortcut conversion of waste to the resulting animal protein does not recycle as far down the food chain as might be most advantageous, and the production of vermicompost—while perhaps offering a higher nitrogen assay than vermicast on a per se basis—is counterintuitively less advantageous in at least some applications, with vermicast being in this sense a higher value-added and more fully converted end product.

The present invention relates in general to vermicasting, and in particular to directing feed stock conversion efficiently into vermicast production with correspondingly reduced diversion of that feed stock Into vermicompost and vermiculture products. The result attends nurturing a "stable" feed-stock-converting worm population and promoting efficient feed stock conversion, in a localized mechanically mixed (as distinguished from faunal perturbation) worm habitat ("epigeic zone"). According to this aspect of the invention, vermicasting (as opposed to vermicomposting and vermiculture), is aimed at increasing the yield/refinement of the vermicast product per se. Note again in this connection that the practices of both vermiculture and vermicomposting result in a mixed product comprised of worms and vermicompost together with some accumulation of vermicast—However not only are vermicast products more ideally composed of high proportions of vermicast content, but the higher the production proportion of vermicast, the lower the requirements are for any post-conversion separation of worms and/or compost. It is also noted in this regard that post-conversion harvesting of worms and separating other compost constituents from the vermicast is a time consuming process—problematic in time requirements and materials handling, and especially so in large scale commercial processing operations. For example, in decompiculture practices which seek to combine vermiculture and vermicasting production the separation of the vermicompost constituency in general (and vermicast in particular) from the vermicultured worms has been acknowledged as problematic. See International Journal of Innovative Research in Science, Engineering and Technology Vol. 2, Issue 8, August 2013—Manyuchi et. Such post-production separation devices can be employed in conjunction with the practice of the present invention if desired, (particularly in removal of "intractable" materials carried over in the original feed stock)—but in any case with the greater proportions of small vermicast particulates in the overall mass of materials exiting the converters according to the present invention, the more efficient such separation becomes. In that regard too, there is provided another aspect of the present invention including a converted product holding bed downstream from the epigeic zone and supporting that zone relative to the mechanical mixers. This holding be can provide a source for mechanically back-mixing at least partially converted materials into the epigeic zone—but also helps to ensure that viable worms have an opportunity to migrate out of the holding zone and back into the active epigeic zone, thereby adding to the self-separation of worms from the vermicast product in accordance with the present invention.

Therefore in accordance with an aspect of the present invention, there is provided a feed stock-to-vermicast converter, comprising an enclosed flow-through vessel having an upstream inlet for introducing convertible feed stock into a mixed epigeic bed conversion zone adapted to accommodate a population of epigeic vermicast-producing worms, communicating with a vermicast-converted feed stock outlet. Convertible feed stock herein includes materials that are amenable to being changed in form, function, or character into vermicast, and can include compost or compostable biodegradable organic materials. Organic waste materials embrace any organic matter considered waste howsoever produced, as for example, foodstuffs and excreta from humans or animals. Also included are bedding materials, inedible parts of foodstuffs and post-plate food waste. Meat and fat products, can be utilized but animal fat content should be restricted to less than 20% by weight of the feed stock mass.

Preferably the mixed epigeic bed zone includes at least one mechanical mixer—and more particularly, one which is adapted to mix fresh feed stock into at least partially converted feed stock in the epigeic bed zone. More preferably, the mixer is adapted to mix at least a substantial proportion, and preferably substantially all, incompletely rendered biodegradable feed stock with fresh feedstock, into the epigeic zone—including collecting at least partially converted feed stock from immediately downstream of the epigeic bed zone.

Epigeic layer mixing (e.g. back mixing) in accordance with the present invention (and especially when employed in conjunction with other environmental monitoring and control) moderates the availability of fresh feedstock concentrations which in turn may moderate worm population dynamics (e.g. worm distribution/migration and biomass production) and encourages more fulsome utilization of convertible feedstock. Post-epigeic return or counter-flows may further these ends. More particularly, mixing-enhanced epigeic depth and/or post-epigeic capture and mixed reprocessing, (through return-flow or in particular counter-flow), of partially depleted flow-through feedstock—can result in as much conforming product as possible with a minimum (if not an elimination) of waste (in the sense or to the extent that diversion of potential feedstock into an overabundance of worm biomass, or underutilization of unconverted compost and un-composted compostable materials are non-conforming product constituents). Such statistical processing in the present sense lends itself to apparatus and/or processing design and operation using qualitative or quantitative statistical process methodologies. Monitoring and controlling the process ensures that it operates at its targeted potential. At its full potential, such an apparatus/process can yield as much conforming product as reasonably possible with a minimum (if not substantial elimination) of losses to nonconforming production.

Therefore, in accordance with the present invention, there is also provided a feed stock to vermicast converter system, comprising an enclosed flow-through vessel adapted for conversion of convertible feed stock to vermicast, and having: an upstream inlet operable for introducing convertible feed stock into the vessel; and, a downstream outlet operable for passing converted vermicast product from the vessel; and, a mixed depth epigeic bed conversion zone intermediate between the inlet and the outlet. The system is operable to accommodate a feed-rate-stabilized population of epigeic vermicast-producing worms; to receive convertible feed stock at a population-stabilizing feed rate from the inlet into intermixed relation in the mixed depth epigeic bed conversion zone with at least partially converted feed stock therein, for a (flow-through-residence) time sufficient for conversion of a predetermined proportion (at least some or even substantially all) of inlet-received convertible feed stock into vermicast; and to pass through converted product having a corresponding proportion of vermicast, at a feed rate balanced rate, on to the downstream outlet for passage there through from the vessel.

In accordance with at least one aspect, the present invention as a whole is adapted such that on a continuous basis once steady state operation has been established, the fresh feed interval/rate is adapted to keep the epigeic worm population generally stable given a back flow of unconverted material within and or into the epigeic zone that is substantially sufficient to keep the population "right sized" to consume substantially all the convertible material available from the original the feed stock. This system is thereby generally dynamically balanced in that virtually all of the compostable material added to the epigeic zone is required for consumption by the epigeic worm population in order for it to remain stable—which in turn results in a very high proportion of vermicast in the final product before post-production separation. More broadly or generally speaking, the system is arranged and operated to balance the addition of fresh, with the back mixing of partially converted material, to a degree where a desired vermicast concentration is achieved in the product exiting the outlet.

In this way, the present invention involves preferentially directing the conversion of biodegradable feedstock to vermicast proportion by increasing the amount of vermicast exiting the mixed epigeic zone and collaterally decreasing unconverted material, preferably reducing such down to substantially intractable residues. Preferably the epigeic zone is substantially separated from the outlet by a holding hopper that viable epigeic worms self-migrate out of (back into the epigeic zone). This further aids in reducing and in some cases even obviates the need for and problems/disadvantages attendant the separation steps.

In an aspect of the present invention, the result is a back mixed enhanced, epigeic-converted vermicast product—preferably a post conversion refined product that is substantially intractable-free and having a post-conversion pre-refining vermicast content of greater than 50% by weight, (preferably about or greater than about 70% and more preferably about 80 to 90%). Vermicast products according to the present invention are particularly useful as soil amendments particularly when produced and screened indoors in a controlled environment, and free of pathogens, seeds and other contaminants. The present system produces first quality casts that are substantially dry and immediately ready for application. They contain macro and micronutrients and are highly hydrophilic (9× traditional compost) and can be applied on the land, mixed into soil or brewed into a tea. The castings produced by the system are suitable for all the aforementioned uses, and may be appropriately packaged for each of same.

In a general sense, the present invention is related to a decompiculture reactor, comprising an enclosed flow-through vessel having an upstream inlet for introducing a decompiculture feed stock into a mixed epigeic bed conversion zone adapted to accommodate a population of epigeic detritovores (as distinguished from microbial actors), communicating with a detritivore-converted feed stock outlet. The present invention variously provides for increasing epigeic detritivore consumption of available feed stock, in increasing the amount of such detritivore products as a proportion of any residual biodegradable materials. These and other and more specific aspects of the present invention will become apparent to persons skilled in the art from the following detailed description.

INTRODUCTION TO THE DRAWINGS

DETAILED DESCRIPTION

Figure 1:
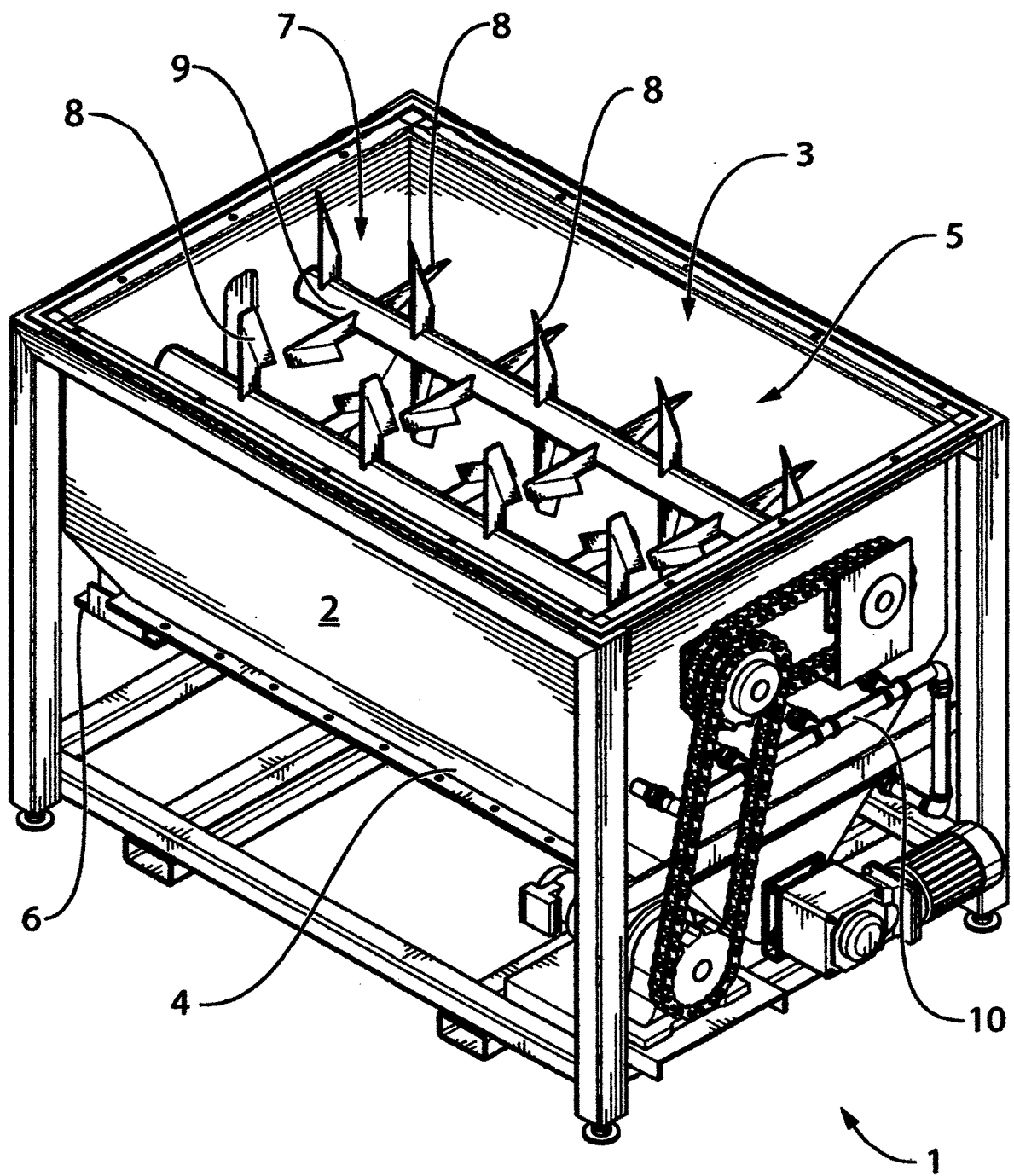
FIG. 1 is a perspective view of a converter according to the present invention.
Figure 2:
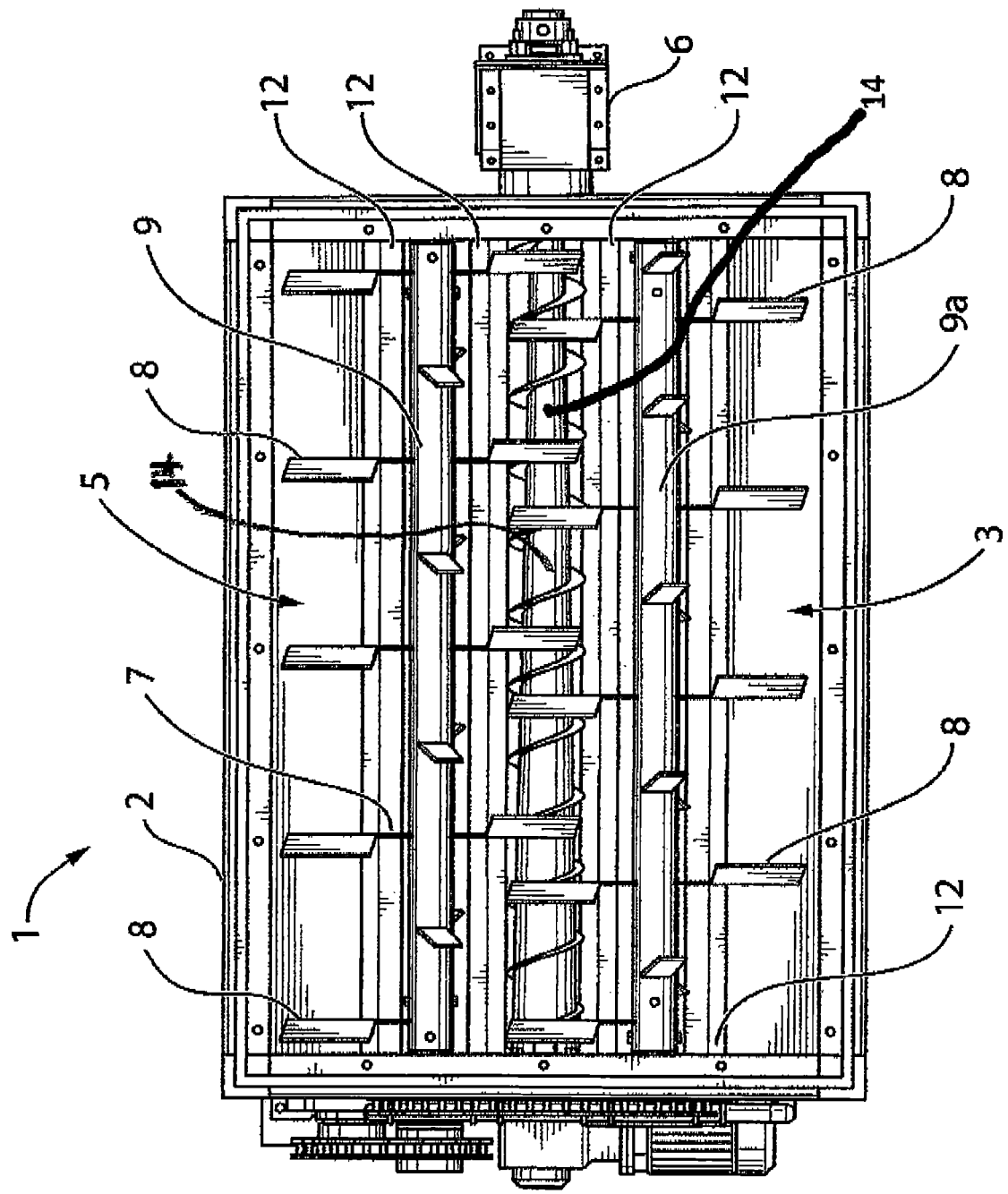
FIG. 2 is a top plan view of the converter illustrated in FIG. 1.
Figure 3:
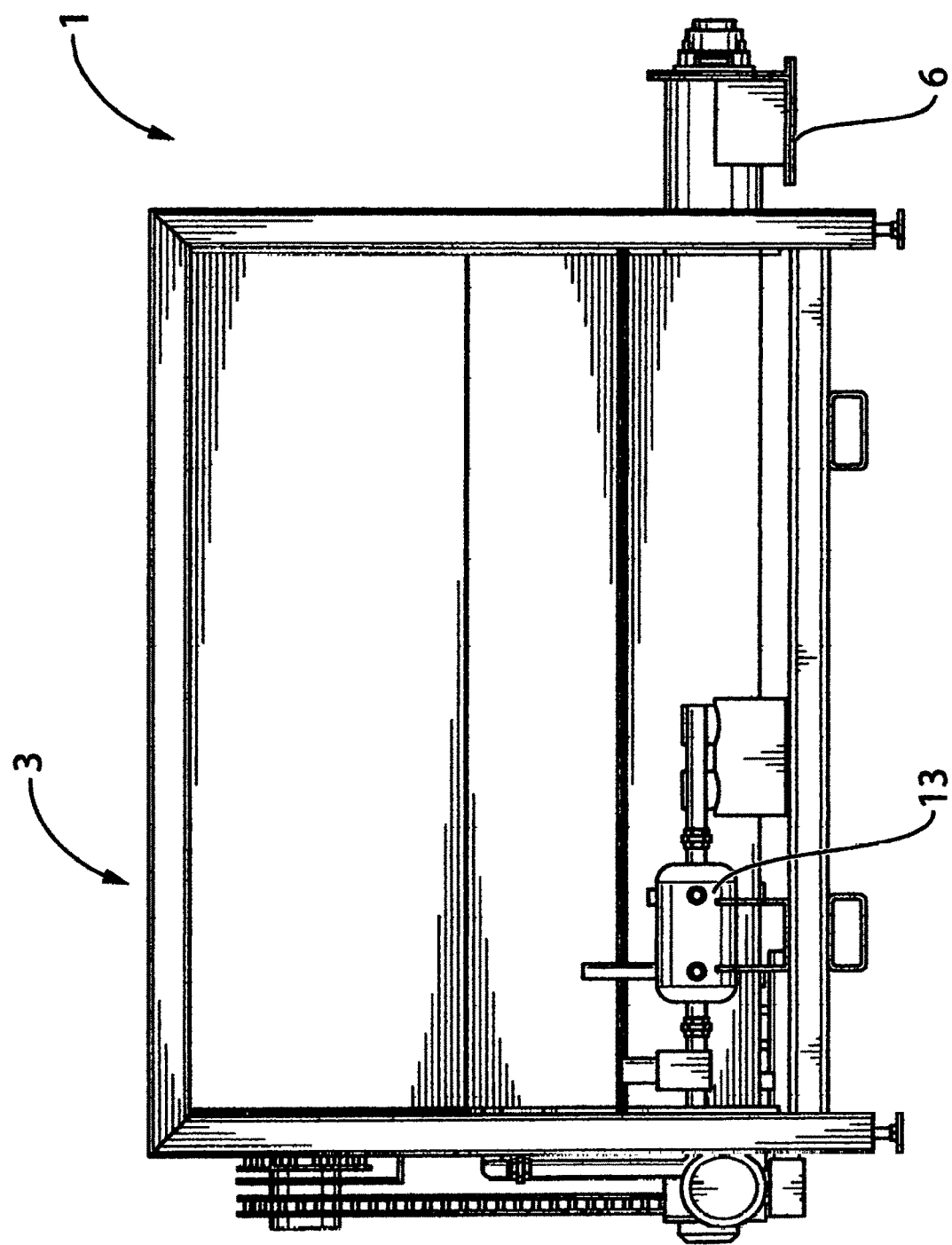
FIG. 3 is an elevated side view of one side of the converter illustrated in FIG. 1.
Figure 4:
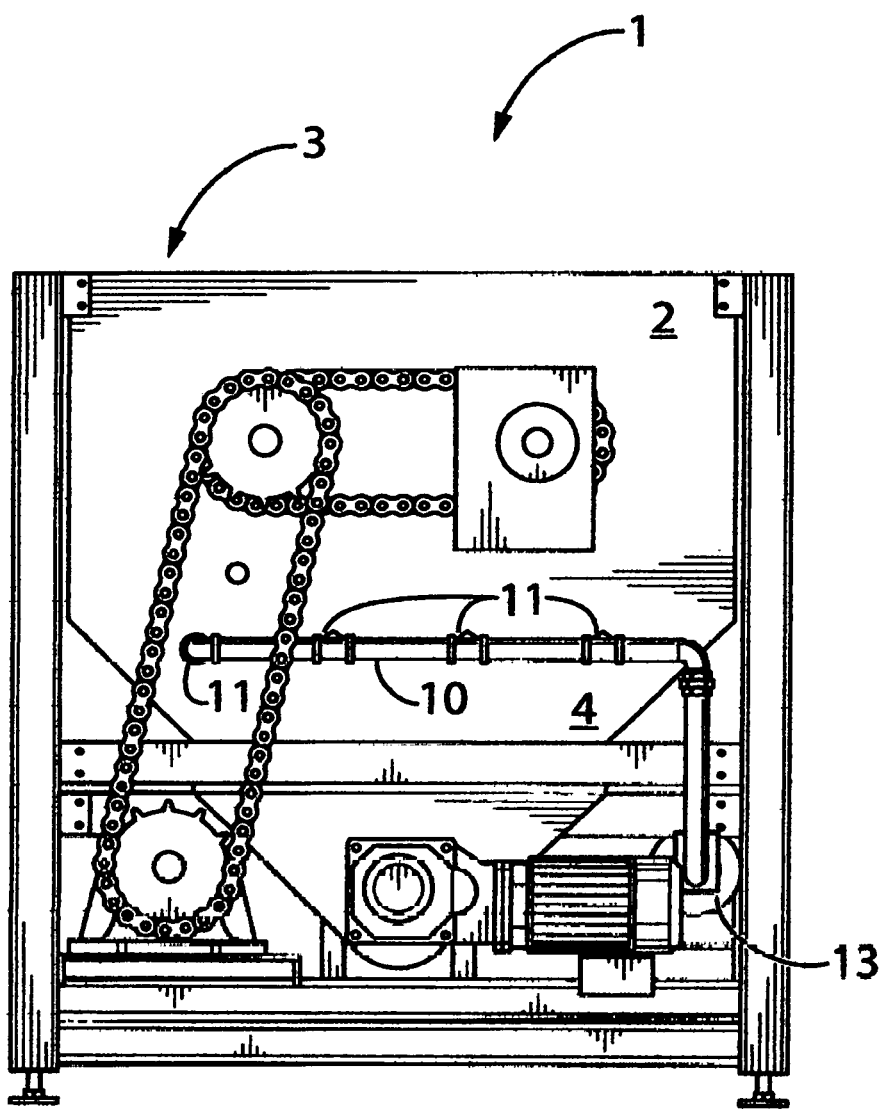
FIG. 4 is an elevated end view of the converter illustrated in FIG. 1.
Figure 5:
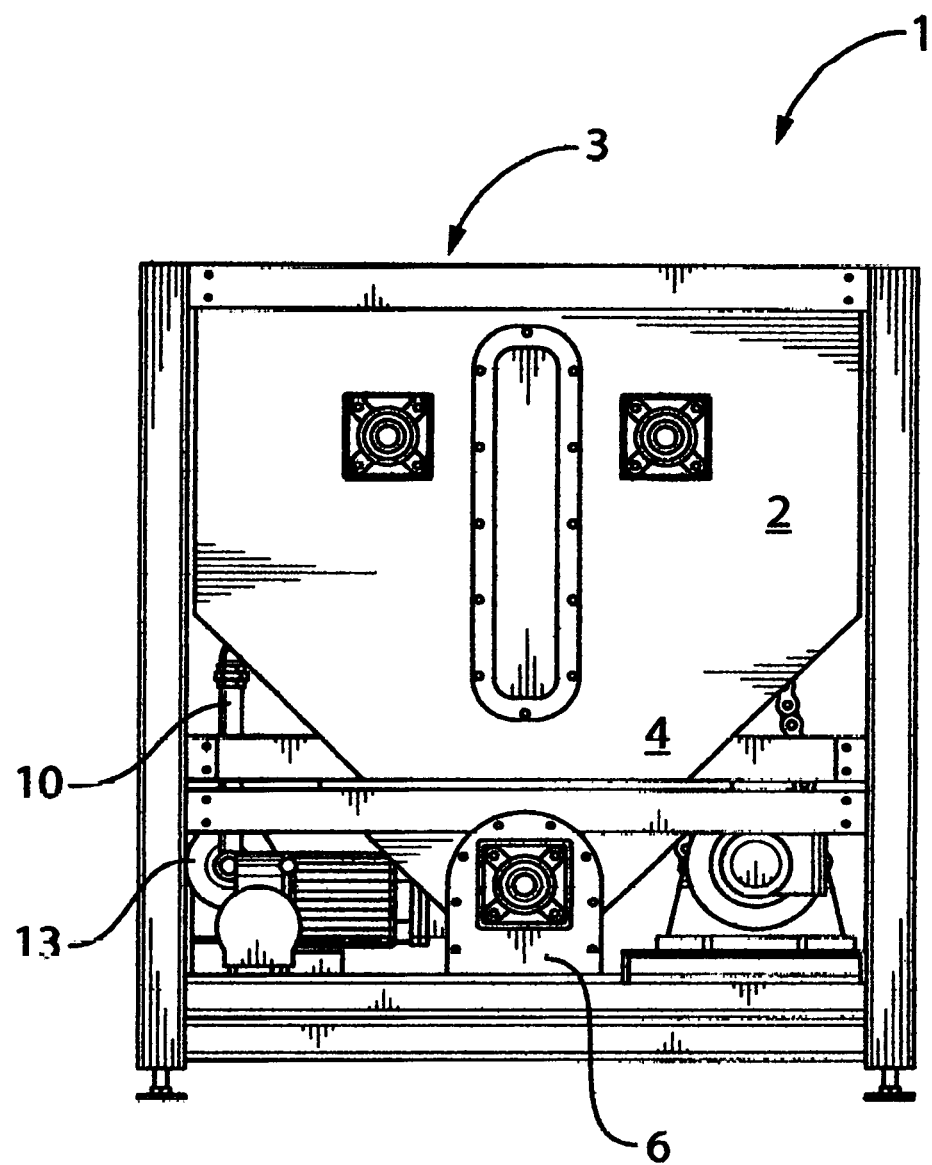
FIG. 5 is an elevated end view opposite that illustrated in FIG. 4.
Figure 6:
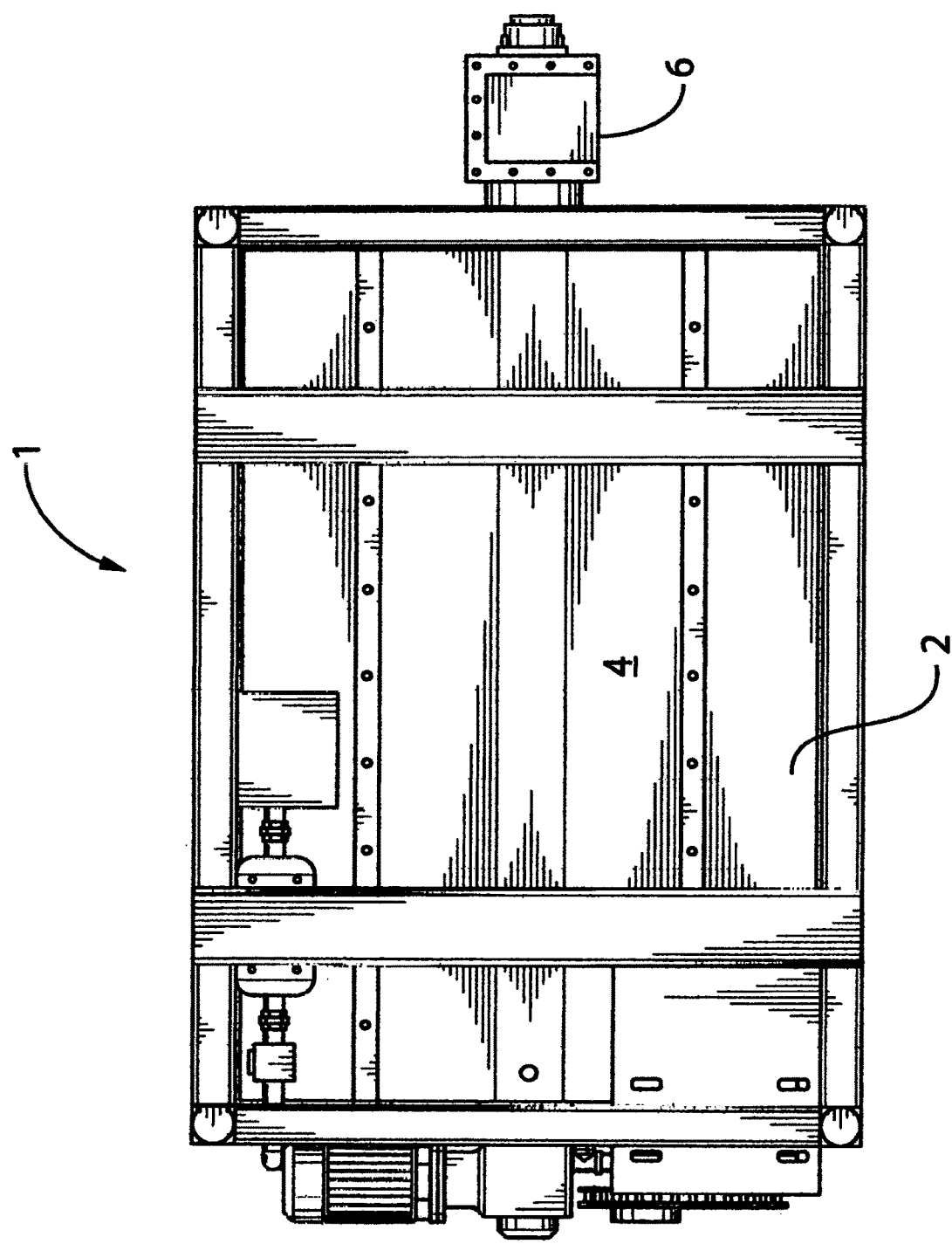
FIG. 6 is a bottom-up view of the converter illustrated in FIG. 1.
Figure 7A:
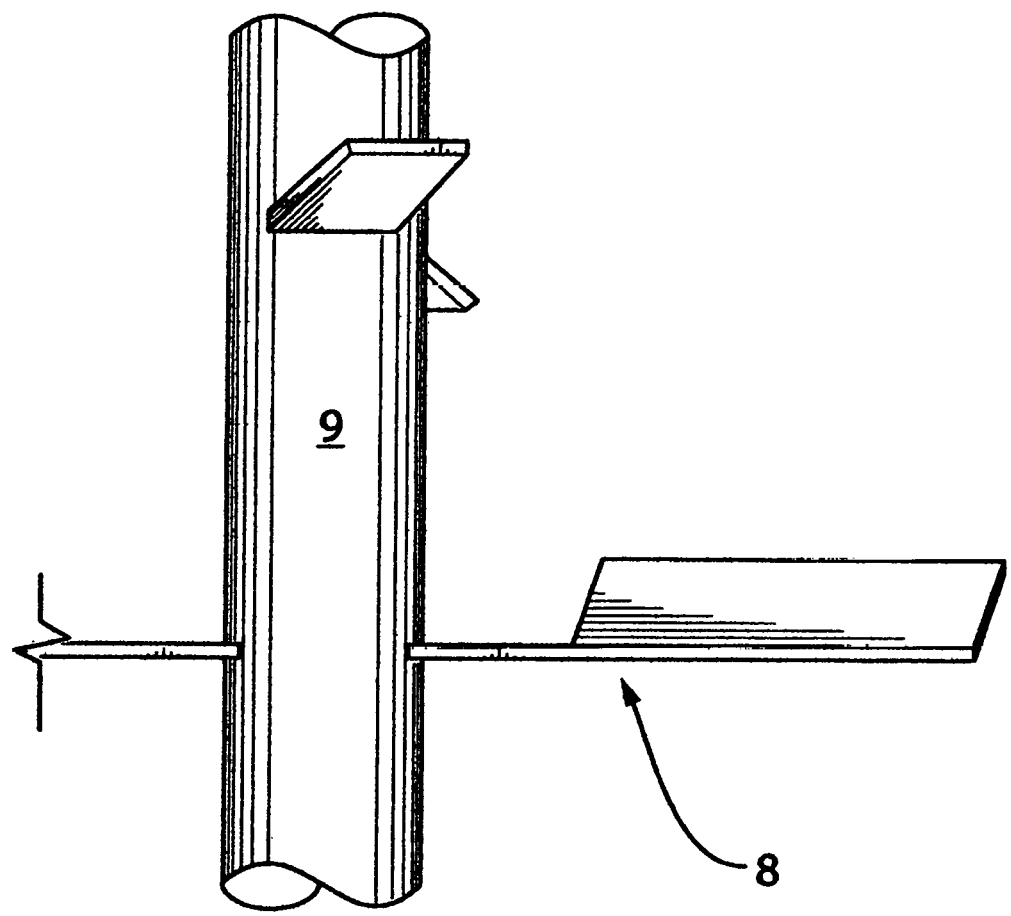
FIGS. 7a, 7b and 7c are respectively, top plan, elevated side and end views of the mixer arrangement in isolation, which is variously otherwise depicted in FIGS. 1 and 2.
Figure 7C:
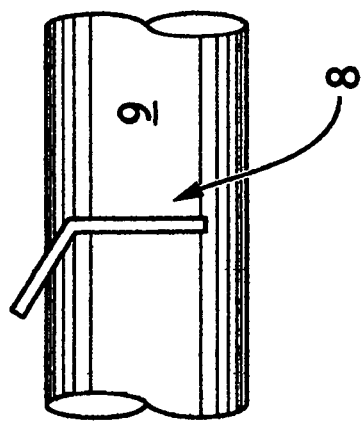
Figure 7B:
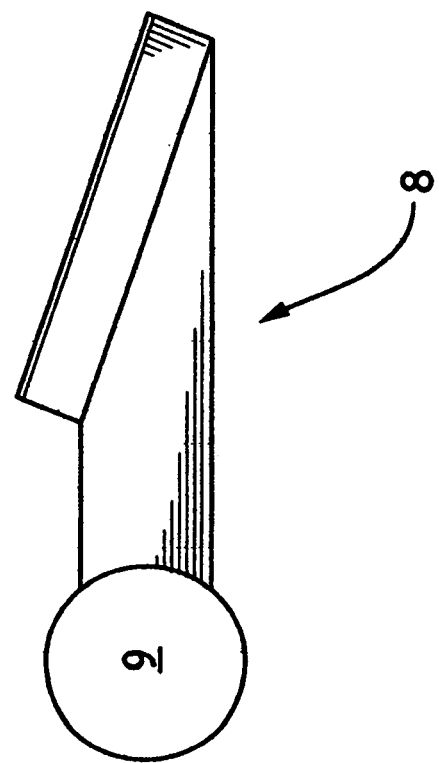

Referring now to the drawings in general there is provided a feed stock-to-vermicast converter 1, comprising an enclosed flow-through vessel 2 having an upstream inlet 3 for introducing convertible feed stock. The vessel 2 is of double-walled construction and adapted to include a closeable cover (not shown) for closing over inlet 3. Vessel 2 is constructed of welded stainless steel with a vee-shaped lower hopper 4. The void between the double walled construction of vessel 2 is insulated with polystyrene insulation to buffer temperature change and reduce the transfer of noise and vibration. The cover is also of stainless steel construction and includes provisions for safety interlocks and for automated feeding. Vessel 2 is supported on levelable feet with rubber pads to further reduce noise and vibration.

The feed stock material is introduced into a mixed epigeic bed conversion zone 5 adapted to accommodate a population of epigeic vermicast-producing worms. Zone 5 communicates, whether directly or indirectly with a vermicast-converted feed stock outlet 6.

The converter vessel 2 as illustrated is a vertical downflow converter and a mixer 7 collects the at least partially converted feed stock from downstream of the epigeic bed zone 5. Provision is made for optionally either an interval or a continuous top feed into a flow-through vessel-enclosed converter 1. Vessel 2 is preferably opaque.

Detritovourous decompiculture worms, such as the red wiggler *Eisenia fetidae*, are epigeic (surface dweller) and together with associated microbes are the ideal vectors for decomposing food waste. Epigeic species habituate natural leaf litter (inhabiting the ectorganic layers: the above soil layer of organic materials) and do not actively redistribute (faunal bioturbation is animal driven mixing of soil) material. According to Jan. 21, 2009, Invasive Worms: Affects on Native Soils, Daniel Halsey, Soil 5125, University of Minnesota, epigeic earthworms dwell within the first inch of the soil litter. Notably in this regard, raised bed vermiculture practices mentioned elsewhere herein are known to use bins to which one inch layers of "worm chow" are added from time to time to accommodate this ecological habit. U.S. Pat. No. 6,223,687 is a thin layer vermicomposting process that employs unmixed biomass layers of 2 to 8 inch thickness in order to overcome vermicomposting problems associated with beds of two to five feet in depth. Epigeic earthworm species include *Dendrobaena octaedra, Dendrobaena attemsi, Dendrodrilus rubidus, Eiseniella tetraedra, Heliodrilus oculantus, Lumbricus rubellus, Lumbricus castaneus, Lumbricus festivus, Lumbricus friend, Satchellius mammalis*. The mixed epigeic conversion zone according to the present invention is a zone in which mixing is employed to increase the effective depth of the ecotype. To some extent this encourages migrating detritivore populations to be more evenly and actively dispersed through the zone by physical relocation and by more uniform distribution of "food" and appealing/sustaining habitat. Back mixing is preferably accomplished as a counter flow (counter current flow within the otherwise predominant flow through the converted), but optionally (not shown) could be carried out as a separated flow isolated from a downstream location and reintroduced into mixed material from at or below the epigeic-zone 5/hopper 4 interface to return worm cocoons and to moderate the availability (concentration) of food in the epigeic zone which may moderate worm population dynamics as well as returning incompletely converted feed stock for vermicast production.

To this end, the converted mixed epigeic bed zone includes at least one mechanical mixer 7 is adapted to mix fresh feed stock into at least partially converted feed stock in the epigeic bed zone 5 and to mix at least a substantial proportion, and preferably substantially all, incompletely rendered biodegradable feed stock with fresh feedstock, into the epigeic zone 5. The mixer 7 includes a plurality of radially extending paddles 8, (about 12 in length) arranged in longitudinally spaced apart relation along a rotatable shaft 9, 9a, and in the illustrated embodiment there are a plurality of such mixers (two) wherein the respective rotatable shafts 9, 9a are arranged about 18 inches apart from extending in interdigitated longitudinal offsets between the shafts 9, 9a.

Provision is also made or at least one aerator 10 for selective aeration of the mixed epigeic bed zone, and in the illustrated embodiment at least one aerator comprises at least one air inlet located in downstream relation to an up-stream diffuser 12. The aerator 10 is a manifold with a plurality of spaced apart air inlets 11 thereon and the diffuser 12 is adapted to facilitate a longitudinal air flow channel through adjacent downstream flows of materials. The aerator 10 manifold and diffuser 12 are located below the mixed epigeic zone 5. The aeration system is preferably devised to ensure even and constant distribution of air throughout the epigeic zone 5. A compressor 13 driven system inserts air under pressure through a network of stainless steel manifold tubes with bottom (downstream) facing holes and an inverted angle-iron diffuser 12 (arranged with its apex pointing upwards in downward material flow dividing relation) facilitates flow-through of materials into the lower portions of vessel 2.

Epigeic zone 5 is supported on a downstream bed comprising converted feed stock, intermediate between the zone 5 and the outlet 6—wherein portions of the vessel 2 enclosing the downstream bed comprise mutually down-stream converging hopper 4 side walls terminating at the outlet 6.

The outlet 6 includes a spiral extractor 14 for extracting downstream vermicast converted feed stock from the converter 1.

Process controls (not shown) are provided for use in the monitoring, or controlling or a combination thereof, of one or more of epigeic zone pH, temperature; and moisture levels. The pH is preferably in the range of at or above 6 to at or below 12. (The pH is preferably less than about 9, more preferably near neutral and especially in the range of from about 6.5 to 7.5). The moisture is about 40 to about 60%, and preferably about 50 to about 55%). The temperature is at least about 20, and preferably at least about 30 and more preferably about 35 or more degrees. The most common worms used in composting systems, redworms (e.g. *Eisenia foetida, Eisenia andrei*, a feed most rapidly at temperatures of 15-25° C. (59-77° F.). They can survive at 10° C. (50° F.). Temperatures above 30° C. (86° F.) may harm them.

In operation, the present invention provides a method for converting a feed stock to vermicast comprising adding convertible feed stock through an upstream inlet into an enclosed flow-through vessel. Feedstock is shredded and dewatered through the use of non-proprietary existing equipment. The feedstock is then loaded into the machine where the ideal conditions within allow for the rapid growth of aerobic bacteria which are in turn ingested by the worm (e.g. *E. Foetidia*) population.

The epigeic bed conversion zone 5 is adapted to accommodate a population of epigeic vermicast-producing worms; and provision is made for mixing, (in the epigeic bed zone 5), of new convertible feed stock into at least partially converted feed stock to form a mixed feed stock; to facilitate converting the mixed feed stock in the epigeic bed zone to vermicast using the worms. The mixing includes mechanical mixing with at least one mechanical mixer 7 in the mixed epigeic bed zone 5 and mixing at least a proportion of incompletely rendered biodegradable feed stock (exiting the epigeic zone) with newly added convertible feedstock, into the epigeic zone 5. Preferably this entails mixing substantially all or at least a substantial proportion of all such incompletely rendered biodegradable feed stock. To ensure optimal distribution of the biomass, the interior of the vessel 2 is equipped with the aforementioned two shaft 9, 9a driven mixers with several pairs of propeller-like paddles 8 that stir the epigeic biomass. The mixer shafts 9, 9a are driven, through reduction gearing, at very low speeds (less than about 20, preferably less than 10 and even more preferably nearer about 2 revolutions per day) and at high torque.

The conditions and worm population (initially about 25000 red wigglers) are optimized such that a 2 meter long embodiment of the illustrated device 1000 kg of (pre-dewatered) organic waste feedstock per day (a 5 meter long device can process 3500 kg per day). In these embodiments the vessel 2 is about 45 inches wide and has an overall depth of about 45 inches. The operation of these converters is adapted to maintain a stable worm population and to utilize a targeted amount and preferably virtually all of the compostable material that is required for sustaining such stability. More broadly or generally speaking, the system is balanced to balance the addition of fresh, with the back mixing or partially converted, to a degree where a desired vermicast concentration is achieved in the product exiting the outlet. The converted vermicast product migrates towards the bottom of the vessel 2 while the worm population continues to remain localized in the epigeic zone 5. As the vermicast product reaches the bottom of the vessel 2 over time it is harvested from the bottom of the hopper 4 using spiral extractor 14 to auger the casts out of the gated outlet 6 at the bottom of the vessel 2. The harvested castings are then screened, variously packaged and sold.

The dynamic balance afforded by the present invention addresses problems that can be associated with, on the one hand, undesired worm biomass production (diversion (excess beyond what is required to maintain the stable worm population) of biodegradable material into vermiculture production) and, on the other hand, unintended or at least undesired vermicompost production at the expense of vermicast production, (i.e. the unintentional or indifferent underutilization of biodegradable feed stock in the desired production of vermicast—by leaving behind unconverted feed stock material). This systemic balancing thereby permits a general control over the (pref. high and even substantially complete) proportion of biodegradable feed stock to vermicast conversion in the product exiting the converter. The mixing of the new with the old feed stock in the zone buffers the flow of feed stock/product materials residence in the conversion zone and hence the availability of biodegradable material to the epigeic (and hence also migratory or counter current movement) worm population.

The invention claimed is:

1. An apparatus comprising in combination, an organic feedstock-to-vermicastings vermiculture converter with a vermiculture sequestering vessel including an upper opening for passing unconverted feedstock into a vessel-defined interior between mutually opposed pairs of interior vessel walls each having a generally vertical orientation to provide a corresponding gravity-fed passage through said interior between said upper opening and a lower distally spaced apart, converted feedstock outlet from said interior, and further defining in mutually superposed relation:

an upper, mixed epigeic vermiculture bed enclosure portion of said interior proximal to said upper opening into said interior and adapted for receiving unconverted feedstock from said upper opening and holding received unconverted feedstock for vermiculture conversion thereof in association with an epigeic mixer operably located in between said vessel walls and within said mixed epigeic vermiculture bed enclosure portion of said interior to provide epigeic mixing of unconverted feedstock during vermiculture conversion thereof; and, a lower converted feedstock bed enclosure mixer-less portion of said interior, defined at least in part between mutually opposed portions of said interior walls having downwardly inwardly convergent wall portions defining an unmixed converted feedstock passage constraint therebetween and thereby being operable in cooperation with said outlet to constrain passage of said converted feedstock through said lower converted feedstock bed enclosure portion while supporting unconverted feedstock within said upper, mixed sequestered epigeic vermiculture bed enclosure portion.

2. The apparatus according to claim 1 wherein said mixer includes at least one mechanical mixer including reduction gearing restricting mixer rotations to less than about 20 revolutions per day.

3. The apparatus according to claim 2 wherein said mixer is adapted to mix fresh feed stock into at least partially converted feedstock in said mixed epigeic vermiculture bed enclosure portion of said interior.

4. The apparatus according to claim 3, wherein said mixer is adapted to mix at least a substantial portion of incompletely converted feedstock with fresh feedstock, into the mixed epigeic vermiculture bed enclosure portion of said Interior.

5. The apparatus according to claim 3, wherein the mixer includes a plurality of radially extending paddles arranged in longitudinally space apart relation along a rotatable shaft.

6. The apparatus according to claim 5 comprises a plurality of radially extending paddles arranged in longitudinally spaced apart relation along a rotatable shaft.

7. The apparatus according to claim 2 wherein at least one aerator is provided for selective aeration of the mixed epigeic vermiculture bed enclosure portion of said interior.

8. The apparatus according to claim 7 wherein the at least one aerator comprises at lease on air inlet located in downstream relation to an up-stream diffuser.

9. The apparatus according to claim 8 wherein the aerator is a manifold with a plurality of spaced apart air inlets thereon and said diffuser is adapted to facilitate an air flow channel through adjacent downstream flows of materials.

10. The apparatus according to claim 9 wherein the aerator manifold and diffuser are located below said epigeic mixer.

11. The apparatus according to claim 1 wherein said outlet is arranged in cooperable shearing relation with a spiral extractor for separating converted feedstock through said opening.

12. The apparatus according to claim 1 wherein the said converter is adapted to pass unconverted feedstock having a moisture content of about 40 to 60%.

13. The apparatus according to claim 12 wherein the moisture content is about 50 to about 55%.

14. The apparatus according to claim 1 wherein said vessel walls comprise a first pair of interior vessel walls comprising shorter mutually opposed end walls, and a second pair of interior vessel walls comprising longer mutually opposed side walls, with said pairs of interior vessel walls cooperatively defining a generally non-square rectangular hopper wherein said outlet comprises a slot opening arranged at the lowermost mutual convergence of said second pair of side walls and said outlet includes a spiral extractor longitudinally extending along at least a portion of said opening.

* * * * *